Patented June 5, 1934

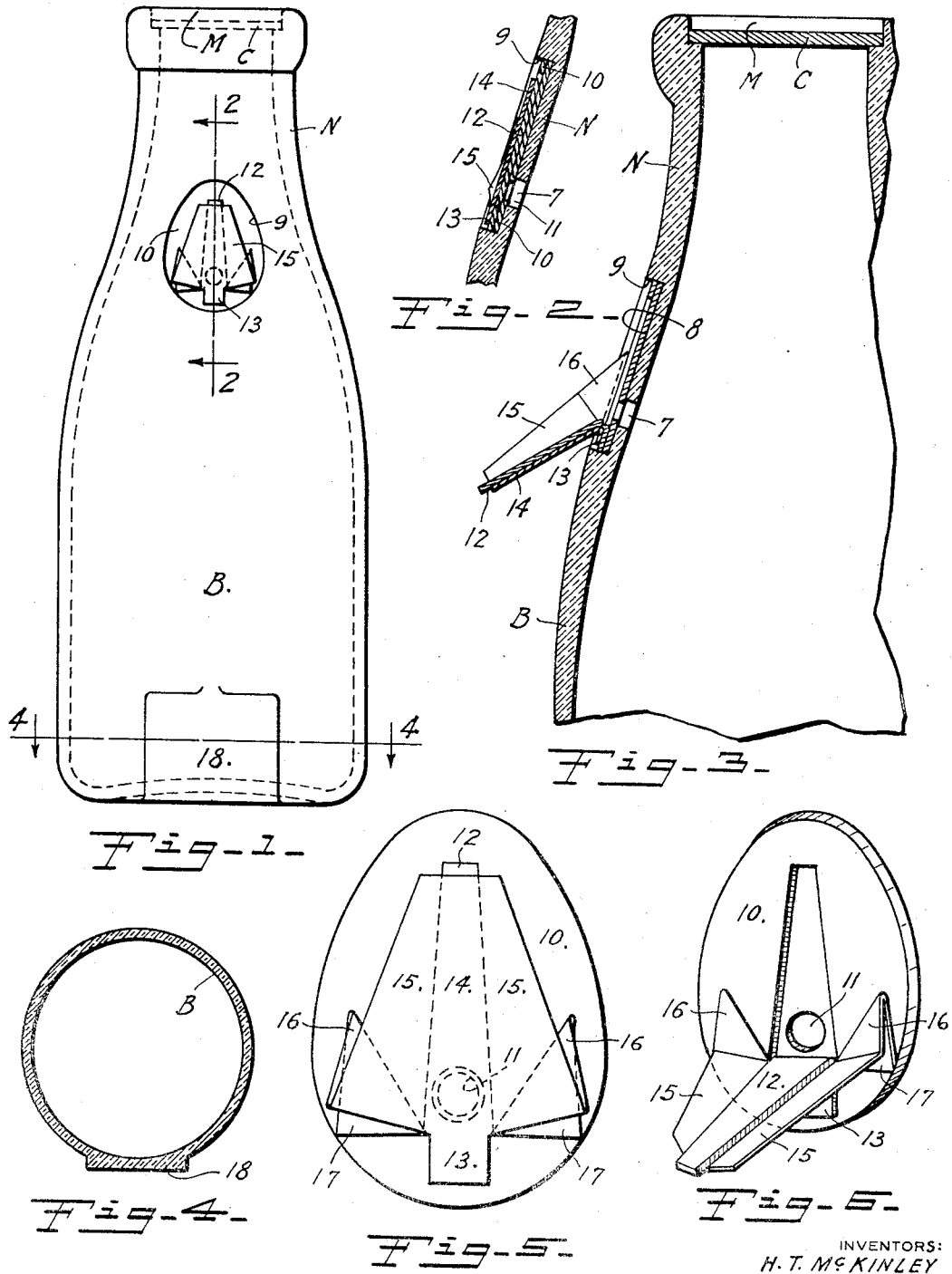

1,961,503

UNITED STATES PATENT OFFICE 1,961,503

MILK BOTTLE AND CLOSURE THEREFOR

Harry T. McKinley, John R. Nichols, Brunie E. Bruns, and Don E. Ford, Council Bluffs, Iowa Application August 14, 1933, Serial No. 684,980

6 Claims. (Cl. 215—31)

Our invention relates to milk bottles and the like, and to closures for such bottles. It is the object of our invention to provide a bottle or container for milk, in which the milk may be sold under seal to prevent contamination thereof, and from which, when desired, the cream may be withdrawn without disturbing the milk which remains in the bottle, or causing any of the milk to be mixed with the cream that is withdrawn therefrom. A further object of our invention is to provide, for a bottle or container of the class having a side-opening or tap, a cap or seal which may be readily opened for the withdrawal of cream from said side-opening or tap, without dripping or waste, which may be closed to re-seal the milk remaining within the bottle, and which may be used also for the pouring of portions of the milk from the bottle without causing dripping or waste thereof. A further object of our invention is to provide, for the side-opening or tap-opening of a bottle of this class, a spout-forming cap or seal which may be mechanically applied to the bottle by automatic capping mechanism. A further object of our invention is to provide a bottle having a side tap-opening, and means facilitating the alining or positioning of the bottle so that the tap-opening is properly presented for receiving a cap from the cap-applying mechanism.

In the accompanying drawing Fig. 1 is a side view of a bottle and closure therefor, embodying our invention, Fig. 2 is a detail vertical section on the line 2—2 of Fig. 1, Fig. 3 is a similar view showing the spout-forming cap in open position, Fig. 4 is a horizontal section of the bottle on the line 4—4 of Fig. 1, Fig. 5 is an enlarged side view of the spout-cap in closed formation, and Fig. 6 is a perspective view of the cap in partly opened formation.

In carrying out our invention according to the illustrated embodiment thereof, we provide a milk bottle of substantially the ordinary general form, having a cylindrical lower or body portion B above which it is gradually reduced in diameter to form the neck N, the upper end of the neck having the mouth M provided with an offset recess or seat for the usual cap C of waxed cardboard or the like, by which the mouth is closed or sealed after the bottle is filled. At one side of the tapering neck, on an intermediate level corresponding substantially to the normal cream-line or plane of separation of the milk and cream when the bottle has been filled with milk of standard quality, there is formed a tap-opening 7, and about the outer end of said tap-opening there is a flat seat 8 which is the bottom or inner end of a shallow oval recess 9. Said oval recess is laterally symmetrical to the tap-opening, the wider end of the oval being lowermost, and the seat 8 extending only slightly below the tap-opening but having a considerable extension above said opening. The marginal wall of the recess 9 is of sufficient depth to receive and retain the oval body portion 10 of the spout-forming cap or closure. Said cap-body comprises inner and outer adherent layers, of material similar to that used for the cap C, and through the inner layer there is formed an opening 11 which is adapted to register with the tap-opening 7 in the side of the bottle, when the cap is in place upon the seat 8 within the recess 9. The outer layer of the cap-body has a slightly tapering tongue 12 incised therefrom, the wider lower end of said tongue remaining hingedly attached to the body at a level slightly below the opening 11, which is closed by the lower portion of the tongue when the latter is in its normal upright position, lying within the recess from which it is cut, and constituting a part of the cap-body, as shown in Figs. 1, 2 and 5. To the front or outer face of the cap-body is affixed the spout-member which is of suitable moisture-proof material such as heavy waxed paper, said member comprising a rectangular tab portion 13 which is adherent to the face of the cap-body below the lower end of the tongue 12, a central elongated portion 14 which is adherent to the face of the tongue 12, tapering wing-portions 15 extending symmetrically from the longitudinal edges of the portion 14, triangular V-fold portions 16 at the lower ends of the wing-portions 15, and triangular tabs 17 adjoining said portions 16 and adherent to the face of the cap-body. In the normal or folded formation of the spout-member, the tab 13, central longitudinal portion 14, and wing-portions 15, are substantially in a uniform plane, lying against the front side of the cap-body, except that the lower parts of the wing-portions 15 are held out slightly by the underlying V-fold portions 16 and tabs 17, as best shown in Fig. 5. The tip or upper end of the tongue 12 extends slightly beyond the part 14 of the spout-member, so that said tip may be conveniently engaged for pulling the tongue out, downwardly and forwardly from the cap-body, to uncover the opening 11 through the inner layer of the cap-body 10. Outward swinging movement of the tongue 12, about the hinged or attached lower end thereof, causes the unfolding or extension of the spout-member, first as shown in Fig. 6, and finally, when the tongue 12 and part 14 have a slightly greater downward inclination, the wings 15 are pulled up into alinement with the respective V-portions 16 to form diverging sides of a trough-like inclined spout, whereof the tongue 12 is the bottom-member. It will readily be seen that when the bottle is in use for containing milk, and after the cream has risen thereon, so that the cream-line or plane of separation of the milk and cream is substantially at the level of the tap-opening 7, the cream may be conveniently withdrawn from the bottle by pulling the tongue 12 out and down to extend the spout-member and uncover the opening 11, holding a suitable receptacle beneath the extended spout, and removing or puncturing the cap C at the mouth of the bottle, to equalize air-pressure upon the liquid and allow free flow thereof at the tap-opening 7. After removal of the cream the tap-opening may be again closed by raising the tongue 12 and pressing the same into the opening of the cap-body 10 in which it was originally held. If desired, the tap-opening and spout may be used for pouring milk from the bottle while holding the latter in a tilted position, and the use of the spout in this manner will prevent any portion of the milk from flowing down the side of the bottle, as may occur when the milk is poured from the mouth M.

The spout-forming cap for the tap-opening is, of course, renewed after each use of the bottle, a fresh cap being disposed in the recess 9 prior to each filling of the bottle. As it is necessary that the cap-body 10 be so disposed that the tongue 12 and spout-member will be properly related to the tap-opening, the recess 9 and cap-body are made oval or otherwise unsymmetrical to any horizontal axis, whereby the spout-cap is insertible in the recess in one position only. When used in large dairies, it is desirable that the placing of the spout-caps be effected automatically by means of suitable capping mechanism, similar to that employed for inserting the caps C after the filling of the bottles. To facilitate the insertion of the spout-caps by machine, it is desirable that the bottles be formed with guide means, definitely related to the spout-cap recesses 9, whereby said guide-means, by coaction with guides or gages on the capping mechanism, may insure the proper positioning of each bottle to receive the cap. In the illustrated structure, the guide-means for the foregoing purpose comprises a flat-surfaced, substantially rectangular boss 18, formed integrally with the cylindrical body B of the bottle adjoining the bottom thereof, at the same side of the bottle in which the tap-opening is provided. Obviously, the guide-means may be variously positioned according to the requirements of the cap-applying mechanism, it being essential merely that all bottles have guide means thereon in definite relation to the cap-receiving recesses thereof.

Now, having described our invention, what we claim and desire to secure by Letters Patent is:

1. The combination with a milk bottle having a tap-opening in the side thereof, and a cap-receiving recess forming a seat about the outer end of said tap-opening; of a cap-body adapted to fit within said recess and engage said seat to normally cover and close said tap-opening, a normally folded spout-member attached to the outer side of said cap-body, and a tongue formed on said cap-body and connected with said spout-member, said tongue normally covering an opening in the cap-body communicating with the tap-opening of the bottle, and the folded spout-member being extensible by movement of said tongue to uncover said opening.

2. The combination with a milk-bottle having a tap-opening in the side thereof substantially at the normal cream-line of the bottle, and a cap-receiving recess forming a seat about the outer end of said tap-opening; of a cap-body seated in said recess and engaging said seat to normally cover and close said tap-opening, said cap-body having an opening extending partially through the same and registering with the tap-opening in the side of the bottle, a tongue formed on the cap-body and normally covering and closing said partial opening therein, and a normally folded spout-member connected with said tongue and extensible thereby simultaneously with movement of the tongue to uncover said opening, whereby the spout-member is extended and positioned to receive liquid from said opening and direct the same outwardly from the side of the bottle.

3. A structure as set forth in claim 1, wherein the recess and cap-body are contoured symmetrically to a vertical axis and unsymmetrically to any horizontal axis, whereby the cap-body is insertible in the recess in one position only.

4. A structure as set forth in claim 2, wherein the recess and cap-body are of oval contour and have a substantially vertical axis of symmetry.

5. In a milk bottle having a tap-opening in the side thereof and a recess forming a seat about the outer end of said tap-opening adapted to receive a cap for covering and closing the tap-opening, a member formed integrally with the bottle and having a rectilinear portion adapted for gaging contact with mechanism for inserting a cap in said recess.

6. The combination with a milk-bottle having a tap-opening in the side thereof substantially at the normal cream-line of the bottle, of a closure for said tap-opening comprising a body-member having a tongue normally extending over said tap-opening to cover and close the same, and a normally folded spout-member connected with said body-member and tongue and extensible with the latter during movement thereof to uncover said tap-opening, whereby the spout-member is positioned to receive liquid from the uncovered tap-opening and to direct the same outwardly from the side of the bottle.

HARRY T. McKINLEY.
JOHN R. NICHOLS.
BRUNIE E. BRUNS.
DON E. FORD.